United States Patent
Mercolino

(10) Patent No.: US 10,977,534 B1
(45) Date of Patent: Apr. 13, 2021

(54) COMPOSITIONS, SYSTEMS, AND METHODS FOR UNIQUE IDENTIFIERS EMBEDDED IN MACHINE VERIFIABLE MARKS HAVING ERROR CORRECTION FEATURES

(71) Applicant: Verinetics, Research Triangle Park, NC (US)

(72) Inventor: Thomas J. Mercolino, Chapel Hill, NC (US)

(73) Assignee: Verinetics, Research Triangle Park (NC)

(*) Notice: Subject to any disclaimer, the term of this patent is extended or adjusted under 35 U.S.C. 154(b) by 0 days.

(21) Appl. No.: 16/551,989

(22) Filed: Aug. 27, 2019

Related U.S. Application Data

(60) Provisional application No. 62/724,057, filed on Aug. 29, 2018.

(51) Int. Cl.
  *G06K 19/06* (2006.01)
  *G06K 7/14* (2006.01)

(52) U.S. Cl.
  CPC ..... *G06K 19/06093* (2013.01); *G06K 7/1434* (2013.01); *G06K 7/1443* (2013.01)

(58) Field of Classification Search
  CPC .......... G06K 19/06093; G06K 7/1434; G06K 7/1443
  USPC ........................................................ 235/494
  See application file for complete search history.

(56) References Cited

U.S. PATENT DOCUMENTS

| | | |
|---|---|---|
| 7,874,489 B2 | 1/2011 | Mercolino |
| 8,220,716 B2 | 7/2012 | Mercolino |
| 8,247,018 B2 | 8/2012 | Mercolino |
| 8,458,475 B2 | 6/2013 | Mercolino |
| 9,053,364 B2 | 6/2015 | Mercolino et al. |
| 9,428,792 B2 | 8/2016 | Mercolino et al. |
| 10,044,704 B1 * | 8/2018 | Freeman ............. G06K 9/4604 |
| 2007/0012783 A1 | 1/2007 | Mercolino |
| 2007/0012784 A1 | 1/2007 | Mercolino |
| 2007/0160814 A1 | 7/2007 | Mercolino |
| 2011/0190920 A1 | 8/2011 | Mercolino |
| 2012/0273564 A1 | 11/2012 | Mercolino et al. |
| 2013/0244894 A1 | 9/2013 | Mercolino |
| 2014/0119615 A1 | 5/2014 | Mercolino et al. |
| 2014/0272973 A1 | 9/2014 | Mercolino et al. |
| 2015/0111780 A1 | 4/2015 | Mercolino |
| 2016/0267510 A1 | 9/2016 | Freeman et al. |
| 2016/0369338 A1 | 12/2016 | Mercolino |
| 2017/0278333 A1 | 9/2017 | Mercolino et al. |
| 2018/0218187 A1 | 8/2018 | Freeman et al. |
| 2018/0359240 A1 | 12/2018 | Freeman et al. |

* cited by examiner

*Primary Examiner* — Seung H Lee
(74) *Attorney, Agent, or Firm* — NK Patent Law

(57) ABSTRACT

The presently disclosed subject matter is directed to compositions of machine verifiable marks comprising embedded unique identifiers and error correction features. In one embodiment, a composition includes an ordered arrangement of reference characters selected from among a plurality of reference characters. Each reference character of the plurality of reference characters is distinct based upon a value calculated by a similarity of one shape to another. The composition further includes a numeric equivalent associated with the reference characters and an error correction feature.

19 Claims, 8 Drawing Sheets

[10044704220716012345677654321010044704220716][10044704220716010044704220716..ETC.]

Simple Check-sum "C"  [(Sum$_{Npos}$) − (Multiple of 7 greater than or equal to Sum$_{Npos}$)] = Checksum Value

FIG. 4A i. Palindrome                              0123456776543210C ii. Over 16 positions                      [(56) − (56)] = 0 iii. Palindrome + C repeat                 [0123456776543210C][0123456776543210C][0123456776543210C][etc.]

iv. Symbol sequence                        ♪♩♫♬♪♩♫♬♪♩♫♬♪♩♫♬♪♩♫♬♪♩♫♬♪♩♫♬♪♩♫♬ v. Unreadable location in sequence         ♪♩♫♬♪♩?♬♪♩♫♬♪♩♫♬♪♩♫♬♪♩♫♬♪♩♫♬♪♩♫♬ vi. Calculated value for missing symbol    [(Sum{012346776543210 + ?}) − (56)] = 0 vii. Calculated value for missing symbol   [(51) − (56)] + 0 = ? = 5 = ♫

FIG. 4B i. Random UID     10044704220716 + C ii. Over 14 positions     [(38) - (42)] = 4 iii. Palindrome + C repeat     [100447042207164][100447042207164][100447042207164][etc.]

iv. Symbol sequence v. Unreadable location in sequence vi. Calculated value for missing symbol     [(Sum{10044704220016 + ?}) - (35)] = 1 vii. Calculated value for missing symbol     [(38) - (35)] + 4 = ? = 7 = 7

FIG. 4C

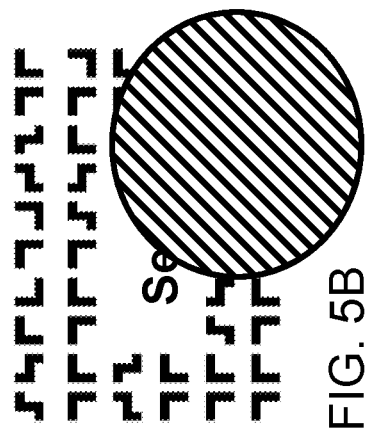
FIG. 5A
FIG. 5B
FIG. 5C[0123456742424242][01...etc.
FIG. 5D
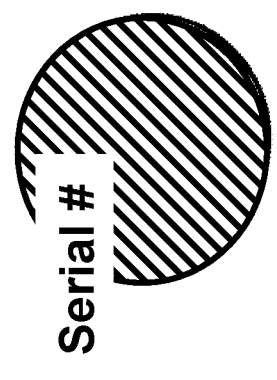
FIG. 5E

COMPOSITIONS, SYSTEMS, AND METHODS FOR UNIQUE IDENTIFIERS EMBEDDED IN MACHINE VERIFIABLE MARKS HAVING ERROR CORRECTION FEATURES

PRIORITY CLAIM

This application claims the benefit of U.S. Provisional Patent Application No. 62/724,057, filed on Aug. 29, 2018, the entire content of which is incorporated herein by reference.

TECHNICAL FIELD

The present invention relates to compositions, systems and methods for unique identifiers embedded in machine verifiable marks having error correction features.

BACKGROUND

Valuable articles are commonly counterfeited or fraudulently represented. Life-saving products are always high value, and regrettably, disproportionately targeted by the bad actors that commit these crimes.

Product authentication is the means whereby a legitimate product may be distinguished from a counterfeited fake designed to resemble the genuine article. Product authentication also plays a critical role in distinguishing diverted or "gray market" products, which are by definition legitimately manufactured products distributed into markets other than originally intended in violation of a contract, law, or regulation. Closely linked to product authentication are "track and trace" of product movement in the supply chain from manufacturer to intermediary suppliers and retailers to end customers.

Authentication methods are also widely used as way to provide secure access to sensitive areas and/or information. Examples include passwords, biometrics, facial recognition and/or public-private key methods.

Further, product identification at the item level is desirable in cases where an individual instance of like products must be distinguished from all other instances of that product. A person's signature affixed to a document, whether done so manually or through digital processes, falls into this latter category.

Also useful is the authentication and identification of text in documents subject to changes. In general, any document of value is subject to changes for fraudulent purposes. Examples include prescriptions for controlled substances (e.g., narcotic analgesics), medical records, supply chain documents (e.g., customs forms and manifests), and academic records (e.g., transcripts, letters of recommendation, and diplomas).

Drug counterfeiting has become a significant issue in the healthcare community and the pharmaceutical industry worldwide. In the absence of safety regulations imposed upon authentic equivalents, counterfeit drugs often have issues including substandard drug quality and/or quantity, and/or harmful ingredients. These issues expose patients to corresponding health risks. Problems of product diversion are closely related to counterfeiting. Product diversion can occur at the point of manufacture, in packaging and repackaging operations, by reintroduction into the supply chain of expired or stolen product. Other problems of product diversion also occur when higher-end products intended for specific and protected distribution channels are diverted to lower-end (e.g. big box) distribution channels.

Additionally, many types of packages or documents include unique identifiers embedded in machine verifiable marks, such as a bar code. One problem with conventional, open-format product identification labeling systems like a barcode is that a counterfeiter may produce labels emulating legitimate versions using publicly available software.

Proprietary codes like TRAXSECUR™ enable valid, registered unique identifiers to be embedded in machine-readable marks. Such codes address the risks of open-format product identification labeling systems by making it virtually impossible for fraudsters to generated valid, registered unique identifiers embedded in machine-readable marks. The codes further make it virtually impossible to unlawfully obtain one mark on a product and attempt to either modify that product or move the mark (e.g. by copying) to a different product. Proprietary codes may also provide a way to quickly and easily verify that different, independent identifiers on the same product are properly correlated with one another according to the way they were created when the packing was originally produced.

However, whether produced from an open-format product identification labeling system or in a proprietary code, unique identifiers embedded in machine-readable marks are subject to reading errors. Such errors may occur unintentionally (for example, because of a vibration to a printer head on a manufacturing line) or intentionally (e.g., caused by fraudsters attempting to undermine the intended security of the identifier, for example, by smudging, obscuring, or otherwise defacing the mark).

Accordingly, there remains a need for new compositions of machine verifiable marks and their associated methods and devices to address these disadvantages and others not described herein.

SUMMARY

The present disclosure describes compositions of machine verifiable marks comprising embedded unique identifiers (sometimes referred to as the "UID") and error correction features.

In one embodiment, a composition includes an ordered arrangement of reference characters selected from among a plurality of reference characters. Each reference character of the plurality of reference characters is distinct based upon a value calculated by a similarity of one shape to another. The composition further includes a numeric equivalent associated with the reference characters and an error correction feature.

In some embodiments, the ordered arrangement of reference characters may be represented by a linear arrangement and the linear arrangement may be rendered in more than one line. The linear arrangement may form a content space. The content space may include information in a public form comprising at least one of alphanumeric text, a barcode, a data matrix code, a quick response (QR) code, or the like. The content space may also include information required to decode the error correction feature.

In some embodiments, the error correction feature may include a repeat structure, and/or an error correction bit. The repeat structure may include a tandem repeat, a distant repeat, a staggered repeat, a palindrome, or the like. The error correction feature may be an error correction bit including a parity bit, a checksum, a circular redundancy check, a hash function, a Reed-Solomon code, or the like.

A method includes generating an ordered arrangement of reference characters comprising a repeat structure of the reference characters. Each reference character among a plurality of reference characters includes a value calculated based upon a similarity of a first character shape to a second character shape. The method further includes (1) associating each reference character with a numeric equivalent; (2) rendering the ordered arrangement of reference characters on an original item; (3) capturing a representation of the ordered arrangement of reference characters from the original item; (4) determining, using an error correction feature, from the representation of the ordered arrangement of reference characters an errored reference character for which a value may not be determined; and (5) identifying the errored reference character based upon a position in the repeat structure. The method may also include storing a registration signature in a database.

In some embodiments, the ordered arrangement of reference characters may be represented by a linear arrangement. The linear arrangement may be rendered in more than one line. The linear arrangement may form a content space. The content space may include information in a public form having alphanumeric text, a barcode, a data matrix code, a quick response (QR) code, or a combination thereof.

The content space may include information required to decode an error correction feature. The error correction feature may include a repeat structure, an error correction bit, or a combination of a repeat structure an error correction bit, or the like. The repeat structure may include a tandem repeat, a distant repeat, a staggered repeat, a palindrome, or the like. In certain embodiments, the error correction feature may be an error correction bit comprising at least one of a parity bit, a check sums, a circular redundancy check, a hash function, a Reed-Solomon code, or the like.

According to another embodiment, a computing device includes a memory and at least one processor configured for receiving an image of machine verifiable marks comprising embedded unique identifiers and error correction features borne by a candidate article subject to identification or authentication; The computing device is further configured for extracting a unique identifier from the image of machine verifiable marks using the error correction features; and determining, based upon a comparison between the unique identifier and match information, whether the candidate article is a reference article. In some embodiments, a relationship between the unique identifier and identification or authentication is stored in a database.

In some embodiments, the computing device may include a camera and the camera may be configured for capturing the image of machine verifiable marks. For example the computing device may be a smart phone, a tablet, a laptop, a smart watch, or the like In some embodiments, the computing device may be electrically coupled to a barcode reader/scanner. In other embodiments, the computing device is wirelessly coupled to a bar-code reader/scanner. The computer device may also be coupled to the bar-code reader/scanner over a network.

According to another embodiment, a method is implemented on a computing device. The method includes receiving an image of machine verifiable marks comprising embedded unique identifiers and error correction features borne by a candidate article subject to identification or authentication. The method further includes extracting a unique identifier from the image of machine verifiable marks using the error correction features; and determining, based upon a comparison between the unique identifier and match information, whether the candidate article is a reference article.

According to another embodiment, a non-transitory computer-readable storage medium stores instructions to be implemented on a computing device including at least one processor and a memory. The instructions when executed by the at least one processor cause the computing device to provide a method. The method includes receiving an image of machine verifiable marks comprising embedded unique identifiers and error correction features borne by a candidate article subject to identification or authentication. The method further includes extracting a unique identifier from the image of machine verifiable marks using the error correction features; and determining, based upon a comparison between the unique identifier and match information, whether the candidate article is a reference article.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 2A illustrates an association rubric for one of many possible associations between numerical integers and a representative reference character set as may be used in accordance with embodiments of the present disclosure.

FIG. 2B illustrates five of many possible redundancy patterns as may be used in accordance with embodiments of the present disclosure. The repeat unit is underlined in each case.

FIG. 2C illustrates the numerical unique identifiers that may be determined from the patterns of FIG. 2B using the association rubric shown in FIG. 2A in accordance with embodiments of the present disclosure.

FIG. 3D shows a mark created as a border for content using the reference character string of FIG. 3B, wherein the reference characters are constrained to a sixteen reference character-wide by eight reference character high field and where the null character encoded by the digit 9 has been inserted in the string in accordance with embodiments of the present disclosure.

Figure 1:
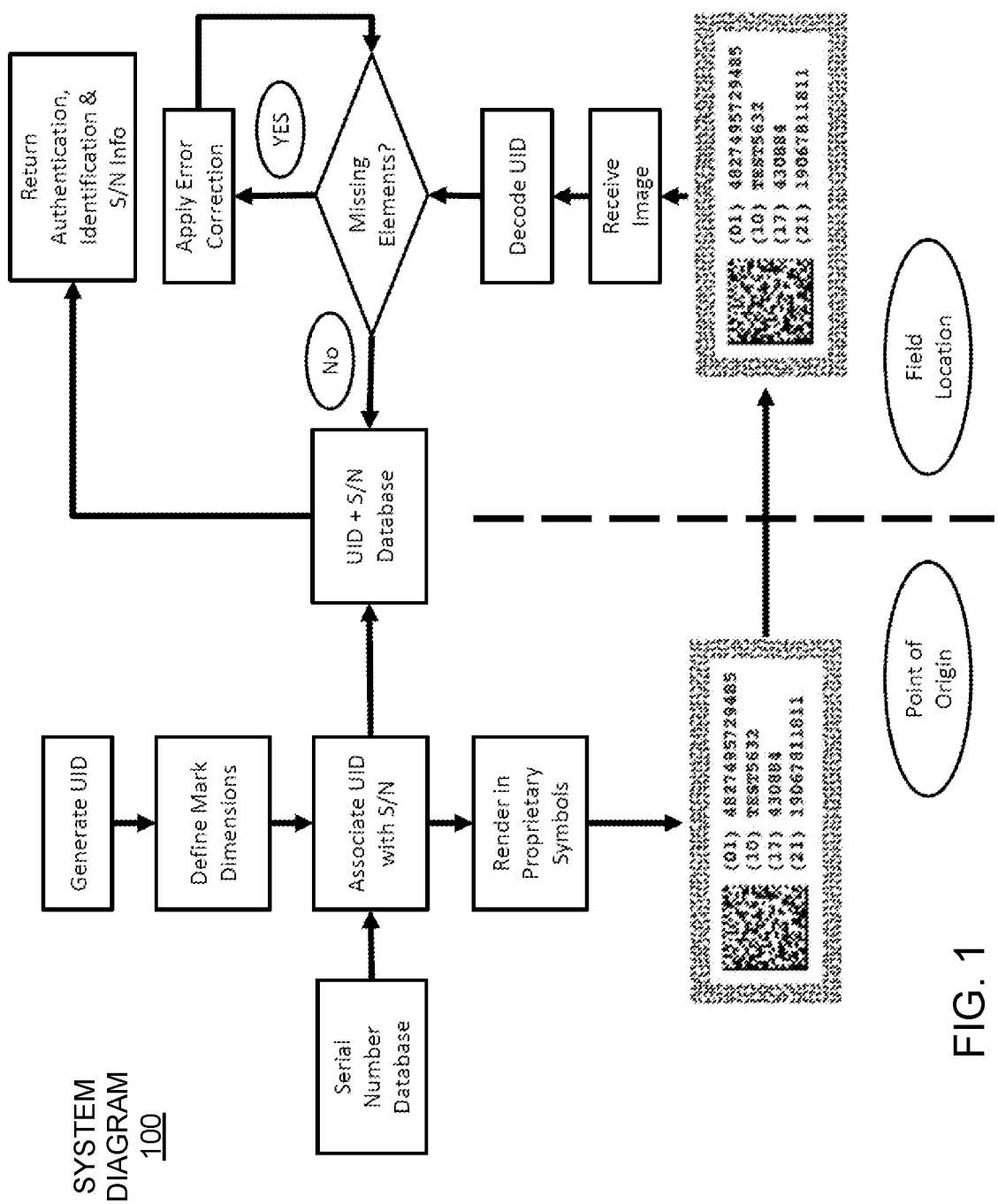
FIG. 1 illustrates a system diagram in accordance with embodiments of the present disclosure

FIGS. 4A to 4C illustrate two examples where a checksum digit is used to recover code elements in accordance with embodiments of the present disclosure. FIG. 4A gives an equation for a simple checksum based upon reference character association with integral values (defined in FIG. 2A). An example of a palindromic repeat with the checksum digit appended is shown in FIG. 4B.i to 4B.viii. FIG. 4B.i shows the palindrome as a numerical sequence and appended checksum digit "C". Calculation of the checksum value is shown in 4B.ii., and the resulting numerical redundant sequence shown in 4B.iii. FIG. 4B.iv illustrates a complete conversion of the numerical sequence to reference characters, again according to the rubric of FIG. 2A. FIG. 4B.v shows recoverable code elements and a missing elements indicated by "?". Calculation steps for recovering the missing reference character and corresponding numerical value are given in steps 4B.v1 and 4B.vii. In parallel fashion to the steps of FIG. 4B.i to 4B.vii, recovery of a missing entity is illustrated in a second example, this time with a random sequence to be repeated steps of FIG. 4C.i to 4C.vii.

FIGS. 5A to 5E are graphical illustrations of an example where redundancy is used to recover code elements and corresponding content in accordance with embodiments of the present disclosure. FIG. 5A shows a border of elements that encode a UID redundantly, and in which the border surrounds content (a "Serial #" in cartoon fashion), corresponding to the item illustrated in FIG. 1. FIG. 5B shows obscuration of a portion of the mark of FIG. 5A. FIG. 5C shows recoverable code elements and missing elements indicated by "?". Translation of those code elements to numerical equivalents is sufficient to identify the mark's UID, as seen in FIG. 5D. Content is recovered by database inquiry based upon the recovered UID (FIG. 5E).

Figure 6:
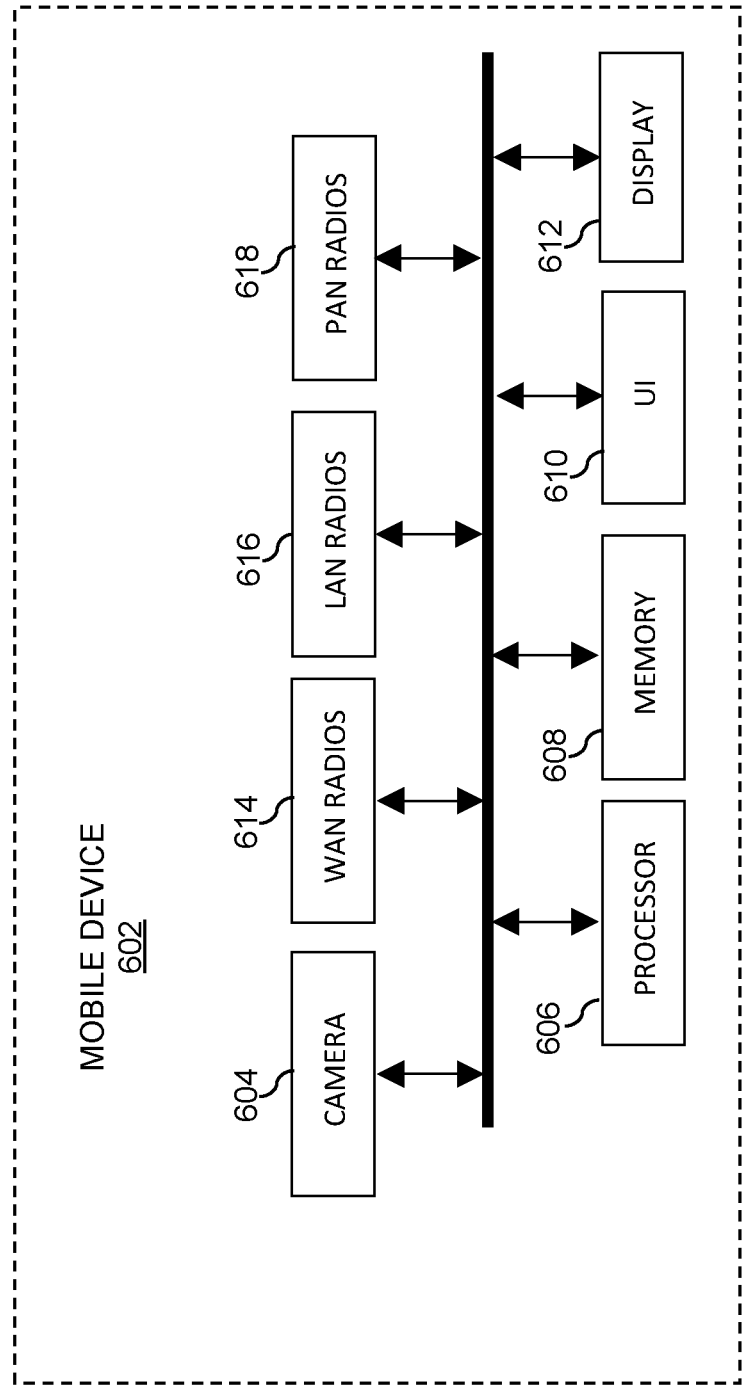

FIG. 6 depicts a block diagram illustrating a mobile device that includes a camera for capturing and analysis of compositions in accordance with embodiments of the present disclosure.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Described herein are compositions of machine verifiable marks comprising embedded unique identifiers and error correction features wherein the unique identifier forms a repeating pattern over lengths greater than that used to form a security mark for a product.

Further described herein are compositions of machine verifiable marks comprising embedded unique identifiers and error correction features wherein the unique identifier forms a repeating pattern over lengths less than that used to form a security mark for a product.

Further described herein are compositions of machine verifiable marks comprising embedded unique identifiers and error correction features wherein the mark comprises a signal for starting or stopping read of a unique identifier.

Further described herein are compositions of machine verifiable marks comprising embedded unique identifiers and error correction features, wherein said features are selected from one or more of: redundant unique identifier information embedded in the sequence of entities, patterns of redundancy selected from among the group: simple repeats, distant repeats, tandem repeats, palindromes, and repeats encoded in symmetrically-related rotation of element, all as further defined and described below.

Further described herein are compositions of machine verifiable marks comprising embedded unique identifiers and error correction features, wherein said features are error correction bits.

Further described herein are compositions of machine verifiable marks comprising embedded unique identifiers and error correction features, wherein said features are error correction bits selected from among the group: parity bits, check sums, a circular redundancy check, and/or a hash function.

Further described herein are compositions of machine verifiable marks comprising embedded unique identifiers and error correction features, wherein said features are error correction bits that are encoded, the encoding selected from among the group: at a specified position in a string of elements, by an element only used to encode error correction bits, and/or in the frequency array of elements by type.

Further described herein are compositions of machine verifiable marks comprising embedded unique identifiers and error correction features, wherein said features are error correction bits that are encoded in elements, the relationship with which and mathematical properties used in error correction are hidden.

Further described herein are compositions of machine verifiable marks comprising embedded unique identifiers and error correction features, wherein error correction comprises both redundancy and error correction bits Further described herein are machine verifiable marks comprising embedded unique identifiers and error correction features borne by a candidate article subject to identification and/or authentication, wherein a relationship between the unique identifier and identification and/or authentication is stored in a database.

Further described herein are systems and methods for machine verifiable marks comprising embedded unique identifiers and error correction features to retrieve associated information from a database.

Further described herein are systems and methods for machine verifiable marks comprising embedded unique identifiers and error correction features borne by a candidate article subject to identification or authentication, wherein the candidate article is a physical object chosen from the group comprising: a pharmaceutical product, a medical device, a diagnostic kit, a cosmetic, a veterinary product, a garment, a retail product, food or beverage, a bottle, a box, a container, a shipping package, a label, or combinations thereof.

Further described herein are systems and methods for machine verifiable marks comprising embedded unique identifiers and error correction features wherein the mark is borne on a tamper evident label, such tamper evidence selected from among the group wherein: the unique identifier is illegible after removal of the label, the label leaves a detectable residual feature after removal and/or, the label is frangible.

Further described herein are systems and methods for machine verifiable marks comprising embedded unique identifiers and error correction features borne by a candidate article subject to identification and/or authentication, wherein the candidate article is a digital rendering, such as a screen image, screenshot, PDF, or the like.

Further described herein are systems and methods for machine verifiable marks comprising embedded unique identifiers and error correction features that degrade when copied.

Further described herein are systems and methods for machine verifiable marks comprising embedded unique identifiers and error correction features that degrade when exposed to certain environmental conditions.

Further described herein are systems and methods for machine verifiable marks comprising embedded unique identifiers and error correction features borne by a candidate article subject to identification and/or authentication, wherein identification or authentication information about the article is retrieved upon error correction.

Further described herein are describes a computing device comprising: a processor and a memory operable to: capture an image of machine verifiable marks comprising embedded unique identifiers and error correction features borne by a candidate article subject to identification or authentication; correct errors in said mark based upon its error-correction features, extract a unique identifier from the corrected mark; and determine, based upon a comparison between the extracted unique identifier and match information, whether the candidate article is a reference article.

As referred to herein, the term "computing device" should be broadly construed. Examples may include a server, a workstation, a personal computer (PC), a smart phone (e.g. cell phone), a tablet, a laptop, a smart watch, or the like. An imaging device may be any computing device operable to take to capture image data.

As used herein, an article is a physical object on which a label may be applied. Examples of articles can include (but are not limited to) garments, shipping boxes, vehicles, personal property, electronics, etc.

As used herein, a reference article is an article whose identity is known, such as a person.

As used herein, a candidate article is an article whose identity is to be determined by examination of a mark applied to the article, such as a person whose identity is known.

As used herein, a label refers to machine detectable information affixed to an article. A label may be applied to an article through a number of different methods, including printing on the article or affixing to an article. A label may be visible to the human eye or invisible but machine readable, as in the case of magnetic ink.

As used herein, a mark comprises a label that is embedded with an authorization code. Authorization codes are selected to be unique, and uniquely identify the article within the disclosed system. A mark may be applied to an article through a number of different means including printing on the article or affixing a label to an article. A mark may be visible to the human eye or invisible but machine readable, as in the case of magnetic ink.

As used herein, an authentication code may be any appropriately configured code, including a random code of assigned variables. The code may be any of the codes disclosed in co-pending U.S. patent application Ser. No. 13/457,115 filed on Apr. 26, 2012 and U.S. Pat. No. 9,053,364 filed on Oct. 30, 2013, the entire contents of which are incorporated by reference herein.

As used herein, a signature may be a numerical signature determined from the authorization code. In some embodiments, the signature is a numerical signature.

As used herein, a unique identifier is any identifier that is unique within the disclosed system. An example of a unique identifier is an authorization code.

As used herein, a barcode is an optical, machine-readable, representation of data. In some embodiments, the data describes something about the object that carries the barcode. Originally barcodes systematically represented data by varying the widths and spacing of parallel lines, and may be referred to as linear or one-dimensional (1D). Later two-dimensional (2D) codes were developed, using rectangles, dots, hexagons and other geometric patterns in two dimensions, usually called barcodes although they do not use bars as such. Characteristic of barcode technologies is that each position carries just two bits of information, i.e., a location is black (1) or white (0).

As used herein, a security thread is physical fiber capable of being imprinted with a machine-readable mark.

As used herein, a tamper evident seal is a seal where it is possible to detect if the seal has been opened or tampered with. As used herein a tamper evident seal may include an embedded security thread.

The unique identifiers embedded in machine-readable marks may be any appropriately configured code, including a random code of assigned variables. The code may be any of the codes as disclosed in U.S. patent application Ser. No. 14/067,945 (issued as U.S. Pat. No. 9,053,364), U.S. patent application Ser. No. 14/936,587 (issued as U.S. Pat. No.

10,044,704), and U.S. patent application Ser. No. 15/935, 708 (published as U.S. Publication No. 2018/0218187) the entire contents of which are incorporated by reference herein. The code may also be any of the printed codes of U.S. patent application Ser. No. 11/455,817 (issued as U.S. Pat. No. 7,874,489) and U.S. patent application Ser. No. 11/455,717 (issued as U.S. Pat. No. 8,458,475), the entire contents of which are incorporated by reference herein.

The disclosed compositions are machine verifiable marks comprising embedded unique identifiers and error correction features. Whether produced from an open-format product identification labeling system or in a proprietary code, unique identifiers embedded in machine-readable marks are subject to reading errors. Such errors may occur unintentionally, as may occur because of vibration to a printer head on a manufacturing line, handling in the supply chain, or by some other accidental means. Additionally, fraudsters may smudge, obscuring, tear, attach extraneous marks or otherwise deface the mark in an attempt to undermine the intended security of the identifier.

The disclosed compositions of the machine verifiable marks include those with one or more reference characters. The reference characters may be alphanumeric characters. In some embodiments, the reference characters are reference characters functional in the "gridding" method described in U.S. patent application Ser. No. 14/067,945 (issued as U.S. Pat. No. 9,053,364).

In the disclosed compositions of the machine verifiable marks, one or more reference characters are provided on a predetermined arrangement map, as is illustrated for the border surrounding a data matrix code and alphanumeric serial number in FIG. 1.

The one or more reference characters may be placed onto the image in a random position and at a fixed frequency, wherein the frequency array of reference character ("entity") by type ("cluster") comprises at least two distinct clusters of entities having detectable counts or relative counts per cluster ("signature array") that encodes a product authentication code as is more fully described in U.S. patent application Ser. No. 11/455,817 (issued as U.S. Pat. No. 7,874, 489).

The one or more reference characters may be placed onto the image in a random position and at a random frequency. The authentication identifier may define orientation marks. Comparing the predetermined arrangement map includes comparing the orientation marks of the authentication identifier with orientation marks of the true authentication identifier. The one or more reference characters includes one or more reference characters with an intrinsic orientation, as is illustrated for one case in the "T" character of FIG. 2A.

Figures 2A, 2B, 2C:
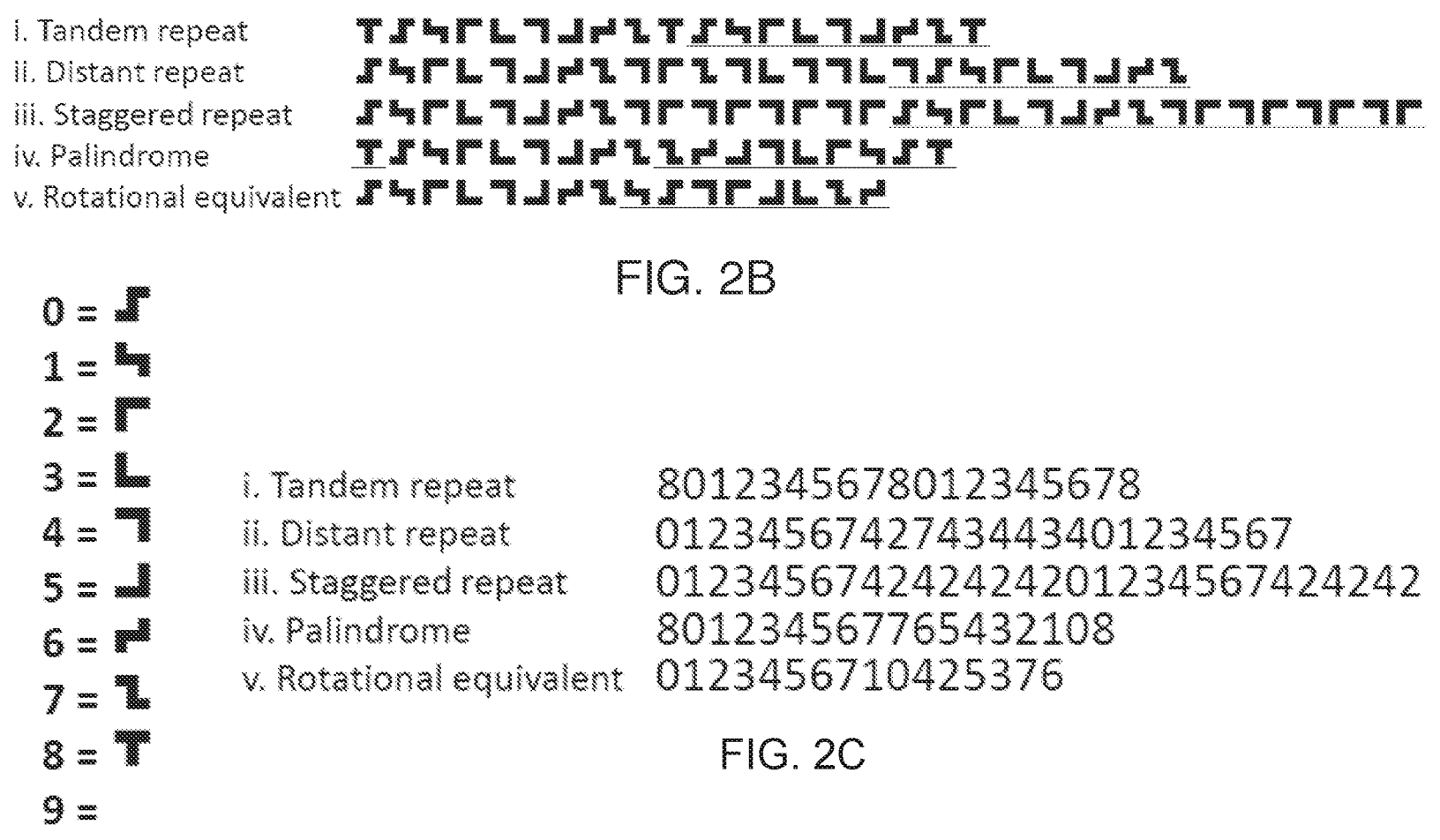

The disclosed compositions of machine verifiable marks include those wherein one or more reference characters are provided on a predetermined association or correlation with numeric values, as shown in FIG. 2A. The skilled practitioner recognizes that the particular set of associations and correlations illustrated is just one of many such sets. Larger sets may be associated with alphanumeric characters such that each association or correlation carries more than a single digit of information. For example, the "L" character can be associated with "3" as shown of "a", "#", etc., and thus be associated with "23", or "4000", or any one of an infinite number of possible numeric value correlations.

The disclosed compositions of the machine verifiable marks can comprise embedded unique identifiers and error correction features wherein error correction may be derived from the unique identifier (sometimes referred to as the "UID") forming a repeating pattern over lengths less than that used to form a security mark for a product. With reference to the illustrations of FIG. 2B, several of many useful configurations for repeating patterns are shown, in each case with the first instance of a repeat underlined to make its recognition easier. Specifically; FIG. 2B (i) illustrates a tandem repeat of the UID; FIG. 2B (ii) illustrates a repeat at a distance separated by non-repeating sequence; FIG. 2B (iii) illustrates a staggered repeat of two different types of UID sequences; FIG. 2B (iv) illustrates a palindrome, wherein the UID runs is formed from a forward and reverse sequence of reference characters; and FIG. 2B (v) illustrates a "rotational" repeat, wherein reference characters selected after a unit distance are rotated by 90 degrees to the right. The corresponding numerical UIDs encoded by the Figures of 2B are given in FIG. 2C. As would be understood by the skilled practitioner, each of these examples of repeat structure are not limiting, that a random sequence repeat is also a useful composition of this invention, and that the corresponding numeric UIDs are infinite in number.

Figures 3A, 3B, 3C:
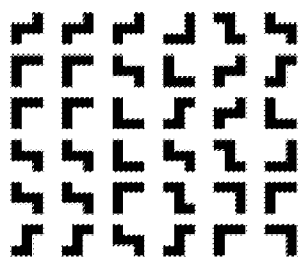
FIG. 3A illustrates a complex numerical unique identifier that combines a random sequence (1004470422071) terminating in a checksum digit (6) that repeats at a distance separated by an internal palindrome in accordance with embodiments of the present disclosure. Each unique repeating UID is set off within [brackets].
FIG. 3B shows the conversion of the complex UID of FIG. 3A into a reference character string according to the rubric set out in FIG. 2A in accordance with embodiments of the present disclosure.
FIG. 3C shows a mark created from the reference character string of FIG. 3B, wherein the reference characters are constrained to a six by six reference characters field in accordance with embodiments of the present disclosure.

One aspect of the disclosed compositions of the machine verifiable marks includes locating the position of characters in a layer for the purposes of determining interaction information between layers. In some cases, the layers are physical layers, as when a border is printed around another information layer, or vice versa. The layer also may be a digital layer, as for example may be useful in analyzing an image of the characters by digitally filtering some or all of the image information unrelated to the characters. FIG. 3 provides two examples. FIG. 3A shows a numeric UID, with repeating pattern (delimited solely for convenience by inserted [brackets]). As has been described above, the rubric of FIG. 2A may be applied to represent the numeric UID in reference characters (FIG. 2B.). FIG. 3C shows a mark created from the reference character string of 3B, wherein the reference characters are constrained to a six by six reference characters field; FIG. 3C shows a mark created as a border for content using the reference character string of 3B, wherein the reference characters are constrained to a sixteen-wide by eight-high reference character high field and where the null character encoded by the digit 9 has been inserted in the string. Either configuration of the composition of this invention may be a layer as described above.

The disclosed compositions of the machine verifiable marks include those wherein the mark comprises a signal for starting or stopping read of a unique identifier. The configurations illustrated in FIG. 3 may provide such starting stopping signals. For example, a rule may be set for reading the UID of the composition starting from upper left, lower right, or from any designated position and reading frame direction. Moreover, associating one of the compositions illustrated in FIG. 3 with other, asymmetrical information (e.g., the data matrix position in relation to alphanumeric information) may provide an orientation frame for reading the UID. In yet another example, the "T" character of FIG. 2A may be inserted at the beginning and end of a repeat unit. Similarly, a defined string (e.g., "LLLL" or some less obvious alternative) may be used for delimiting purposes. As would be appreciated by the skilled practitioner, the foregoing examples serve for illustration purposes only, including without limiting combinations of features described.

The disclosed compositions of the machine verifiable marks include those wherein the error correction features are error correction bits. Examples of error correction bits include: parity bits, check sums, a circular redundancy check, and a hash function. FIGS. 4A to 4C illustrate two examples where a checksum digit is used to recover code elements. FIG. 4A gives an equation for a simple checksum based upon reference character association with integral values (defined in FIG. 2A). There is no limit to the number of positions used in calculating the checksum. However, checksums calculated over relatively small string length allow for recovery of missing string elements. An example of a palindromic repeat with the checksum digit appended as shown in FIG. 4B (i) to (vii). FIG. 4B (i) shows the palindrome as a numerical sequence and appended checksum digit "C". Calculation of the checksum value is shown in FIG. 4B (ii), and the resulting numerical redundant sequence shown in FIG. 4B (iii). FIG. 4B (iv) illustrates a complete conversion of the numerical sequence to reference characters, again according to the rubric of FIG. 2A. FIG. 4B (v) shows recoverable code elements and a missing elements indicated by "?". Calculation steps for recovering the missing reference character and corresponding numerical value are given in steps FIG. 4B (vi) and (vii). In parallel fashion to the steps of in FIG. 4B (i) to (vii), recovery of a missing entity is illustrated in a second example, this time with a random sequence to be repeated steps of FIG. 4C (vi) and (vii). It is understood by the skilled practitioner that error correction bits may be encoded, by specifying position in a string of elements, by an element only used to encode error correction bits, or in the frequency array as described above. The error correction bits may be encoded in elements encoded in such a way that the relationship between the numeric values or mathematical properties used in error correction are hidden from the knowledge of all but the code's creator. The rubric of FIG. 2 is illustrative, as a reassortment of assignment of numeric values to character impacts error bit results. Moreover, it is apparent to the skilled practitioner that the examples given are illustrative of the compositions disclosed herein and are not meant to be limiting.

One design for disclosed compositions includes where error correction comprises both redundancy and error correction bits. For example, the cartoon of FIG. 5A has both a redundancy in the UID encoded in the border and may have a checksum or hash thereof associated with its frequency array code. The example illustrate in FIGS. 5A to 5E shows how redundancy in the composition allows for recovery code elements and corresponding content. FIG. 5A shows a border of elements that encode a UID redundantly, and in which the border surrounds content (a "Serial #" in cartoon fashion, corresponding to the item illustrated in FIG. 1); FIG. 5B shows obscuration of a portion of the mark. FIG. 5C shows recoverable code elements and missing elements indicated by "?". In embodiments wherein a relationship between the unique identifier and identification or authentication is stored in a database, associated identification or authentication information about the article may be retrieved upon error correction, as is shown with respect to the example of FIG. 5. Translation of those code elements to numerical equivalents is sufficient to identify the mark's UID, as seen in FIG. 5D. Content is recovered by database inquiry based upon the recovered UID (FIG. 5E), with reference to FIG. 1).

Machine verifiable marks borne by a candidate article may be identified or authentication or authenticated according to the system and methods outlined in FIG. 5A. Candidate articles may be physical objects chosen from the group comprising one or more of: a pharmaceutical product, a medical device, a diagnostic kit, a cosmetic, a veterinary product, a garment, a retail product, food or beverage, a bottle, a box, a container, a shipping package, and a label. Labels used according to this system and method may be tamper evident. The tamper evidence feature may be one or a combination of: the unique identifier is illegible after removal of the label; the label leaves a detectable residual feature after removal; or the label is frangible. In certain embodiments, the error correction features of these marks degrade when copied or when exposed to certain environmental conditions.

Similarly, the systems and methods for machine verifiable marks may be applied to authentication or identification of a digital rendering, such as a screen image, screenshot, PDF or the like.

The presently disclosed subject matter may include a computing device comprising: a processor and a memory operable to: capture an image of machine verifiable marks comprising embedded unique identifiers and error correction features borne by a candidate article subject to identification or authentication; correct errors in said mark based upon its error-correction features, extract a unique identifier from the corrected mark; and determine, based upon a comparison between the extracted unique identifier and match information, whether the candidate article is a reference article. In such embodiments, a relationship between the unique identifier and identification or authentication is stored in a database.

In some embodiments, the computing device may be electrically or wirelessly coupled to an imaging device such as a camera and/or bar-code reader/scanner. The computing device may include an imaging device. In certain embodiments, the computing device may be a mobile device such as a smart phone, a tablet, a laptop, a smart watch, or the like.

FIG. 6 depicts a block diagram 600 illustrating a mobile device 602 (i.e. computing device) that includes a camera 604 for capturing and analysis of compositions of machine verifiable marks in accordance with embodiments of the present disclosure. The mobile device 602 may be a smart phone (e.g. cell phone), a tablet, a laptop, a smart watch, or the like.

The mobile device 602 also includes a processor 606 and a memory 608. In some embodiments the memory 608 or a portion of the memory 608 may be integrated with the processor 606. The memory 608 may include a combination of volatile memory (e.g. random access memory) and non-volatile memory (e.g. flash memory). The memory 608 may include program instructions when executed by the processor 606 allow the mobile device to read via the camera 604 and analyze the one of more of the previously described compositions. In certain embodiments, the processor 606 may be a mobile processor such as the Qualcomm® Snapdragon® mobile processor. For example, the processor 606 may be the Snapdragon® 855

The mobile device 602 also includes a display 612. The mobile device 602 may also include a user interface (UI) 610. The UI 610 and the display 612 may be integrated such as a touchpad display.

The mobile device 602 may include WAN radios 614, LAN radios 616, and PAN radios 618. The WAN radios 1910 may include 2G, 3G, 4G, and/or 5G technologies. The LAN radios 616 may include Wi-Fi technologies such as 802.11a, 802.11b/g/n, and/or 802.11ac circuitry. The PAN radios 618 may include Bluetooth® technologies.

The mobile device 602 may also include one or more sensors (not shown in FIG. 6). The sensors may also include a global positioning system (GPS) sensor, a magnetic sensor (e.g. compass), a three-axis gyroscope sensor, an accelerometer sensor, a proximity sensor, a barometric sensor, a temperature sensor, a humidity sensor, an ambient light sensor, or the like. In some embodiments the mobile device 602 may be a smart phone, an iPhone® or an iPad®, using iOS® as an operating system (OS). The mobile device 2402 may be a mobile terminal including Android® OS, BlackBerry® OS, Windows Phone® OS, or the like.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A composition comprising:
   an ordered arrangement of reference characters selected from among a plurality of reference characters, wherein each reference character of the plurality of reference characters is distinct based upon a value calculated by a similarity of one shape to another;
   a numeric equivalent associated with the reference characters; and
   an error correction feature,
   wherein the error correction feature comprising at least one of a repeat structure, an error correction bit, or a combination of a repeat structure and an error correction bit.

2. The composition of claim 1, wherein the ordered arrangement of reference characters is represented by a linear arrangement.

3. The composition of claim 2, wherein the linear arrangement is rendered in more than one line.

4. The composition of claim 3, wherein the linear arrangement is rendered in more than one line and forms a content space.

5. The composition of claim 4, wherein the content space comprises information in a public form comprising at least one of alphanumeric text, a barcode, a data matrix code, a quick response (QR) code, or a combination thereof.

6. The composition of claim 4, wherein the content space comprises information required to decode the error correction feature.

7. The composition of claim 1, wherein the repeat structure comprising at least one of a tandem repeat, a distant repeat, a staggered repeat, and a palindrome.

8. The composition of claim 1, wherein the error correction feature is an error correction bit comprising at least one of a parity bit, a check sums, a circular redundancy check, a hash function, Reed-Solomon code, or a combination thereof.

9. A method comprising:
   generating an ordered arrangement of reference characters comprising a repeat structure of the reference characters, wherein each reference character among a plurality of reference characters comprises a value calculated based upon a similarity of a first character shape to a second character shape;
   associating each reference character with a numeric equivalent;
   rendering the ordered arrangement of reference characters on an original item;
   capturing a representation of the ordered arrangement of reference characters from the original item;
   determining from the representation of the ordered arrangement of reference characters an errored reference character for which a value may not be determined; and
   identifying the errored reference character based upon a position in the repeat structure.

10. The method of claim 9, wherein the ordered arrangement of reference characters is represented by a linear arrangement.

11. The method of claim 10, wherein the linear arrangement is rendered in more than one line.

12. The method of claim 11, wherein the linear arrangement is rendered in more than one line and form a content space.

13. The method of claim 12, wherein the content space comprises information in a public form comprising at least one of alphanumeric text, a barcode, a data matrix code, a quick response (QR) code, or a combination thereof.

14. The method of claim 12, wherein the content space comprises information required to decode an error correction feature.

15. The method of claim 14, wherein the error correction feature comprising at least one of a repeat structure, an error correction bit, or a combination of a repeat structure and an error correction bit.

16. The method of claim 15, wherein the repeat structure comprising at least one of a tandem repeat, a distant repeat, a staggered repeat, and a palindrome.

17. The method of claim 15, wherein the error correction feature is an error correction bit comprising at least one of a parity bit, a check sums, a circular redundancy check, a hash function, and Reed-Solomon code.

18. The method of claim 9, further comprising storing a registration signature in a database.

19. A composition comprising:
   an ordered arrangement of reference characters selected from among a plurality of reference characters, wherein each reference character of the plurality of reference characters is distinct based upon a value calculated by a similarity of one shape to another;
   a numeric equivalent associated with the reference characters; and
   an error correction feature,
   wherein the error correction feature is an error correction bit comprising at least one of a parity bit, a check sums, a circular redundancy check, a hash function, Reed-Solomon code, or a combination thereof.

* * * * *